United States Patent [19]

Lunk et al.

[11] Patent Number: 5,248,713
[45] Date of Patent: Sep. 28, 1993

[54] STABILIZED POLYMERIC COMPOSITIONS

[75] Inventors: Hans E. Lunk, Menlo Park, Calif.; Timothy S. Smith, Nr. Trowbridge, England; Stephen L. Tondre, Fremont; Alan S. Yeung, Redwood City, both of Calif.

[73] Assignee: Raychem Corporation, Menlo Park, Calif.

[21] Appl. No.: 537,558

[22] Filed: Jun. 13, 1990

[51] Int. Cl.$^5$ ............................................. C08K 5/49
[52] U.S. Cl. .................................. 524/120; 524/147; 524/151; 524/153; 524/195; 428/458; 428/480; 428/473.5
[58] Field of Search ............... 524/120, 147, 151, 153, 524/195; 428/458, 473.5, 480

[56] References Cited

U.S. PATENT DOCUMENTS

| | | | |
|---|---|---|---|
| 3,193,522 | 7/1965 | Neumann | 524/195 |
| 3,523,820 | 8/1970 | Scheffer | 428/480 |
| 3,776,882 | 12/1973 | Witzler et al. | 524/195 |
| 3,835,089 | 9/1974 | Fox et al. | 260/40 R |
| 3,852,101 | 12/1974 | Batchelor, Jr. | 524/195 |
| 3,909,333 | 9/1975 | Eastman | 156/331 |
| 4,048,128 | 9/1977 | Eastman | 524/153 |
| 4,332,855 | 6/1982 | Zingheim et al. | 260/40 R |
| 4,385,145 | 5/1983 | Horn, Jr. | 524/120 |
| 4,520,149 | 5/1985 | Golder | 524/120 |
| 4,536,531 | 8/1985 | Ogawa et al. | 524/153 |
| 4,542,177 | 12/1985 | Kriek et al. | 524/195 |
| 4,692,539 | 9/1987 | Spivack | 524/120 |
| 4,766,164 | 8/1988 | Golder et al. | 524/120 |
| 4,929,656 | 5/1990 | Golder | 524/195 |
| 4,956,407 | 9/1990 | Funasaki et al. | 524/120 |
| 5,132,391 | 7/1991 | White et al. | 428/458 |

FOREIGN PATENT DOCUMENTS 0057415  1/1982  European Pat. Off. .
50-160362  12/1975  Japan .

Primary Examiner—Kriellion S. Morgan
Attorney, Agent, or Firm—Timothy H. P. Richardson; Herbert G. Burkard

[57] ABSTRACT

Compositions containing at least about 30% of a poly(alkylene terephthalate), at least about 3% of a polylactone, about 0.05% to about 10% of a carbodiimide and at least about 0.05% to about 10% of an aliphatic phosphite, all percentages being by weight based on the weight of the composition, has excellent thermal stability. The compositions are useful for wire insulation and cable jacketing. Heat recoverable articles, such as tubing and molded parts can be prepared from the compositions.

32 Claims, No Drawings

STABILIZED POLYMERIC COMPOSITIONS

BACKGROUND OF THE INVENTION

The invention relates to a thermally stabilized polymeric composition which exhibits improved thermal stability, a method of improving the thermal stability of polymeric composition, and an electrical conductor coated with, a cable jacketed with and heat recoverable article made from the stabilized polymeric composition.

Polyesters, such as poly(alkylene terephthalates), for example, poly(ethylene terephthalate) (PET) and poly(butylene terephthalate) (PBT), are subject to thermal degradation, especially at elevated temperatures. It is known, generally, to modify such polyester compositions containing 0 to 60 weight percent of fillers with a polymeric modifier such as polycaprolactone (PCL) but the degree of thermal stabilization provided in this manner is not sufficient for many uses.

U.S. Pat. No. 3,835,089, to Fox and Wambach, recognizes that the physical properties of blends of PBT and PCL are improved over those obtainable with the individual components. This patent does not, however, recognize that PBT/PCL blends can be still further improved with respect to thermal aging properties.

European patent application EP 57, 415 A2 of Ogawa and Akagi discloses compositions of polyester and a modified polycaprolactone. The compositions can further contain various additives such as inorganic fillers, e.g., glass fibers, crystal nucleating agents, phosphorus compounds, epoxy compounds, and other additives, such as flame retardants, antioxidants and heat stabilizers. The addition of phosphorus compounds is said to enhance the heat resistance of the composition. Examples of phosphorus compounds given in this European application include phosphates, phosphites, phosphonic and phosphinic compounds. Trimethyl phosphate and triphenyl phosphite are listed as examples of preferred phosphorus compounds. We have found that phosphates and aryl phosphites are not effective in enhancing the thermal stability of blends of poly(butylene terephthalate) and poly(caprolactone).

The compositions described in the above documents do not possess the degree of thermal stabilization sufficient for many uses.

SUMMARY OF THE INVENTION

It has now been discovered that polyester compositions comprising a poly(alkylene terephthalate) and a polylactone can be provided with exceptional thermal stability by the addition of a carbodiimide and an aliphatic phosphite.

One aspect of this invention comprises a composition comprising at least about 30% of a poly(alkylene terephthalate), at least about 3% of a polylactone, about 0.05% to about 10% of a carbodiimide and at least about 0.05% to about 10% of an aliphatic phosphite, all percentages being by weight based on the weight of the composition.

Another aspect of this invention comprises a method of improving the thermal stability of a composition comprising a poly(alkylene terephthalate) and a polylactone which comprises admixing therewith a carbodiimide and an aliphatic phosphite in amounts effective to thermally stabilize the composition.

A further aspect of this invention comprises an insulated wire comprising an electrical conductor coated with a composition comprising at least about 30% of a poly(alkylene terephthalate), at least about 3% of a polylactone, about 0.05% to about 10% of a carbodiimide and at least about 0.05% to about 10% of an aliphatic phosphite, all percentages being by weight based on the weight of the composition.

Another aspect of this invention comprises a cable jacketed with a composition comprising at least about 30% of a poly(alkylene terephthalate), at least about 3% of a polylactone, about 0.05% to about 10% of a carbodiimide and at least about 0.05% to about 10% of an aliphatic phosphite, all percentages being by weight based on the weight of the composition.

Yet another aspect of this invention comprises a heat recoverable article comprising a composition comprising at least about 30% of a poly(alkylene terephthalate), at least about 3% of a polycaprolactone, about 0.05% to about 10% of a polycarbodiimide and at least about 0.05% to about 10% of an aliphatic phosphite, all percentages being by weight based on the weight of the composition.

The improved thermal stability of the composition of this invention is both dramatic and unexpected. With the incorporation of one weight percent of distearyl pentaerythritol diphosphite and two weight percent polycarbodiimide, the time to failure (TTF) at 200° C. for a flame retarded PBT/PCL composition increased markedly from 46 up to about 206 hours.

DETAILED DESCRIPTION OF THE INVENTION

The composition of this invention comprised a poly(alkylene terephthalate), such as poly(ethylene terephthalate) and poly(butylene terephthalate), in an amount of at least about 30% by weight (all percents given herein are by weight based on the weight of the composition unless otherwise stated). Preferably, the poly(alkylene terephthalate) is present in the amount from about 30% to about 90%, more preferably from about 40% to about 65%. Poly(alkylene terephthalates) are known polymers, some of which are commercially available. The polymers are prepared by polymerizing terephthalic acid or an ester thereof, which may be substituted, for example by halogen, such as bromine, with a glycol, for example ethylene or butylene glycol. The glycol may also be substituted, for example, by halogen, such as bromine. The use of poly(butylene terephthalate) is particularly preferred. These polymers typically have a molecular weight greater than about 10,000 weight average molecular weight.

The composition also contains at least about 3% polylactone. Preferably, the composition contains about 3 to about 40%, more preferably from about 5 to about 30% polylactone. Preferred polylactones have repeating units of the general formula:

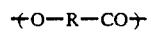

wherein R is divalent alkylene of, e.g., from 2 to 30 carbon atoms, straight chain and branched, and the number of repeating units is such that the average molecular weight is up to about 100,000.

More particularly, the polylactone has the general formula:

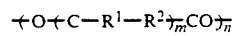

wherein $R^1$ and $R^2$ are hydrogen or alkyl, e.g., methyl or ethyl, m is, for example, 2-5 and n is from about 25 to about 1500. Especially preferred compounds within this family will comprise those in which $R^1$ and $R^2$ are each hydrogen, or are methyl or ethyl on the carbon adjacent to the linking oxygen atom. The most preferred such polylactones are poly(beta-propiolactone), poly(gamma-butyrolactone), poly(delta-valerolactone), poly(epsilon-caprolactone) or mixtures of at least two of them. The use of polycaprolactone is especially preferred.

The polylactone can be made by various methods. For example, by polymerizing the corresponding lactone. Further details on preparative procedures for polylactones may be obtained by reference to The Encyclopedia of Polymer Science and Technology, Vol. 11, John Wiley and Sons, Inc, New York, 1969, p 98-101; H. Cherdron et al. Makromol Chem. 56, 179-186 and 187-194 (1962); U.S. Pat. No. 2,933,477 and U.S. Pat. No. 2,933,478.

The composition also contains about 0.05% to about 10% of a carbodiimide. Preferably the composition contains about 0.1% to about 5% carbodiimide. The carbodiimide is represented by the formula:

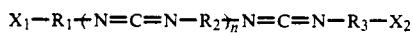

where $R_1$, $R_2$ and $R_3$ are $C_1-C_{12}$ aliphatic, $C_6-C_{13}$ cycloaliphatic, or $C_6-C_{13}$ aromatic divalent hydrocarbon radicals, and combinations thereof, $X_1$ and $X_2$ are H,

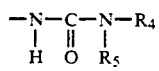

or

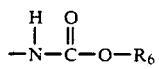

where $R_4$, $R_5$ and $R_6$ are $C_1-C_{12}$ aliphatic, $C_6-C_{13}$ cycloaliphatic and $C_6-C_{13}$ aromatic monovalent hydrocarbon radicals and combinations thereof and additionally $R_4$ or $R_5$ can be hydrogen; and n is 0 to 100. The useful carbodiimides have an average of at least one carbodiimide groups (i.e., one—N=C=N—group) per molecule and an average molecular weight of less than about 500 carbodiimide groups. These carbodiimides can be aliphatic, cycloaliphatic or aromatic carbodiimides. The terms aliphatic, cycloaliphatic and aromatic as used herein indicate that the carbodiimide group is attached directly to an aliphatic group, a cycloaliphatic group or an aromatic nucleus respectively. For example, these carbodiimides can be illustrated by formula (I): wherein $R_1$, $R_2$ and $R_3$ are independently aliphatic, cycloaliphatic or aromatic divalent hydrocarbon radicals and n is at least 0 and preferably 0 to 100. $X_1$ and $X_2$ are defined as hereinbefore. Carbodiimides useful for the compositions of this invention have one or more carbodiimide groups and thus one or more of the three divalent hydrocarbon groups (i.e., $R_1$, $R_2$ and $R_3$) and each of these hydrocarbon groups can be the same or different from the others so that the diimides can have aliphatic, cycloaliphatic and aromatic hydrocarbon groups in one carbodiimide molecule. The use of a polycarbodiimide is preferred.

Carbodiimides can be prepared to use in this invention by well known procedures. Typical procedures are described in U.S. Pat. Nos. 3,450,562 to Hoeschele; 2,941,983 to Smeltz; 3,193,522 to Neumann et al, and 2,941,966 to Campbell.

The composition also contains about 0.05% to about 10% of an aliphatic phosphite. The phosphite compound preferably is present in an amount of about 0.1% to about 5%.

The term "aliphatic phosphite" is used herein to include hydrogen phosphites, monophosphites, diphosphites, triphosphites, polyphosphites and the like, having at least one aliphatic carbon atom bonded to at least one of the oxygen atoms of the phosphite moiety. The phosphites may be mono-di or tri- esters of phosphorous acid or phosphonic acid. The aliphatic carbon may be part of a straight or branched chain aliphatic group, such as an alkyl group, and may be saturated or unsaturated and may be substituted by one or more substituents, such as chlorine or hydroxyl or carboxyl groups, which do not interfere with its action in enhancing the thermal stability of the composition. The aliphatic group may be substituted by aromatic moieties as long as the carbon atom bonded to the oxygen atom of the phosphite moiety is an aliphatic carbon atom. The aliphatic group is preferably an alkyl group containing at least 1 carbon atom, more preferably the aliphatic group is an alkyl group containing about 6 to about 30 carbon atoms. Other aliphatic groups are also suitable and are exemplified in the following list of aliphatic phosphites.

Illustrative aliphatic phosphites include, for example, distearyl pentaerythritol diphosphite, diisodecyl pentaerythritol diphosphite, bis(2,4-di-t-butylphenyl) pentaerythritol diphosphite, diphenyl isodecyl phosphite, diphenyl isooctyl phosphite, phenyl diisodecyl phosphite, diisooctyl phosphite, triisooctyl phosphite, dilauryl phosphite, trilauryl phosphite, tristearyl phosphite, di-tridecyl phosphite, ethylhexyl diphenyl phosphite, diisooctyl octylphenyl phosphite, diphenyl didecyl (2,2,4-trimethyl-1,3-pentanediol) diphosphite, tris(2-chloroethyl) phosphite, tris(dipropyleneglycol) phosphite, heptakis(dipropyleneglycol) triphosphite, tetraphenyl dipropyleneglycol diphosphite, poly(dipropyleneglycol) phosphite, trilauryl trithiophosphite, bis(tridecyl) hydrogen phosphite, dioleyl hydrogen phosphite, and the like.

As will be noted from the examples below only those compounds which have an aliphatic or substituted aliphatic group attached to an oxygen of the phosphite compound are effective in increasing thermal stability of the PBT/PCL composition.

Various additives can be added to the polymeric composition. Such additives include antioxidants such as alkylated phenols, e.g., those commercially available as Goodrite 3125, Irganox 1010, Irganox 1035, Irganox 1076, Irganox 1093, Vulkanox BKF; alkylidene polyphenols, e.g., Ethanox 330; thio-bis alkylated phenol, e.g., Santonox R; dilauryl thiodipropionate, e.g. Carstab DLTDP; dimyristyl thiodipropionate, e.g., Carstab DMTDP; distearyl thiodipropionate, e.g., Cyanox STDP; amines, e.g. Wingstay 29, Nauguard 445, etc; UV stabilizers such as [2,2'-thiobis(4-t-octylphenolato)] n-butylamine nickel, Cyasorb UV 1084, 3,5-ditertiarybutyl-p-hydroxybenzoic acid, UV Chek Am-240; flame retardants such as antimony oxide, decabromodiphenyl ether, perchloropentacyclodecane, 1, 2-bis(tetrabromophthalimido) ethylene; pigments such as titanium dioxide and carbon black, and the like. Mixtures of such additives can be used.

One or more additives may be present in an amount of up to 67% of the composition. It is to be understood that for any specified proportions of the other components, additives are present in amounts to provide 100%.

The composition can be prepared by mixing together the components in any appropriate mixer such as, an internal mixer, for example, a Brabender or Banbury, or a twin screw extruder, for example, a ZSK extruder, or the like.

The composition of this invention is melt processable and can be readily formed into any desired shape. The composition can be used in many applications. A preferred use of the composition is as wire insulation, i.e., as a coating on an electric conductor. The composition is also useful as cable jacketing on electrical or fiber optic cable. The composition can also be used in the preparation of heat recoverable articles, such as heat shrinkable tubing and molded parts.

Heat recoverable articles are well known. A heat recoverable article is one whose dimensional configuration may be made to change when subjected to an appropriate treatment. Usually these articles recover, on heating, towards an original shape from which they have previously been deformed, but the term "heat-recoverable" as used herein also includes an article which, on heating, adopts a new configuration even if it has not been previously deformed.

In their most common form heat-recoverable articles comprise a heat-shrinkable sleeve made from a polymeric material exhibiting the property of elastic or plastic memory as described, for example, in U.S. Pat. Nos. 2,027,962, 3,086,242 and 3,597,372. As is made clear in, for example, U.S. Pat. No. 2,027,962, the original dimensionally heat-stable form may be a transient form in a continuous process in which, for example, an extruded tube is expanded immediately after extrusion, while hot, to a dimensionally heat-unstable form. In other embodiments a preformed dimensionally heat-stable article is deformed to a dimensionally heat-unstable form in a separate stage.

In the production of heat recoverable articles, the polymeric material may be crosslinked at any stage in the production of the article to enhance the desired dimensional recoverability. One manner of producing a heat-recoverable article comprises shaping the polymeric article into the desired heat-stable form, subsequently crosslinking the polymeric material, heating the article to a temperature above the crystalline melting point of the polymer, deforming the article and then cooling the article while in the deformed state so that the deformed state of the article is retained. In use, since the deformed state of the article is heat-unstable, application of heat will cause the article to assume its original heat-stable shape.

The invention will be better understood by reference to the illustrative examples which follow.

EXAMPLES 1-10

Formulations of this invention containing about 57% of poly(butylene terephthalate), about 14% of polycaprolactone, 2.0% polycarbodiimide (PCD) and about 24% of a flame retardant mixture containing 1, 2-bis(-terephthalimido) ethylene, antimony trioxide and magnesium hydroxide, 2.0% of a hindered phenolic antioxidant and 1.0% of an aliphatic phosphite, as listed in Table I, are prepared in a twin screw extruder at temperatures between 175°-290° C.

The formulations are extruded using a 1 inch extruder at about 220°-280° C. onto tin coated copper 20AWG conductor as 10 mil wall insulations.

The samples are evaluated for thermal aging stability using the mandrel wrap method. In general, for each sample four specimens are prepared and heat aged at 200° C. in an air-flow oven. At specified intervals, typically 20-24 hours apart, the wire specimens are removed from the oven and cooled before they are wrapped around a ½ inch diameter mandrel for visual inspection. Any cracks or defects caused by thermal degradation are recorded accordingly. A sample failure is recognized when 50% or more of the specimens (two in this case) showed one or more cracks. The hours to failure are taken to be the average between the time at which a sample failure was noted and the time at which the prior inspection is made. The results are shown in Table I.

TABLE I

| Example | Aliphatic phosphite | Hours to failure |
| --- | --- | --- |
| Control | none | 46 |
| 1 | distearyl pentaerythritol diphosphite | 190 |
| 2 | distearyl pentaerythritol diphosphite with 1% triisopropanol amine | 192 |
| 3 | diisodecyl pentaerythritol diphosphite | 133 |
| 4 | bis(2, 4-di-t-butylphenyl) pentaerythritol diphosphite | 95 |
| 5 | diphenyl isodecyl phosphite | 76 |
| 6 | phenyl diisodecyl phosphite | 124 |
| 7 | tris(dipropyleneglycol) phosphite | 133 |
| 8 | tris(2-chloroethyl) phosphite | 92 |
| 9 | bis(tridecyl) hydrogen phosphite | 193 |
| 10 | dioleyl hydrogen phosphite | 190 |

EXAMPLES 11-14

Comparative

The procedures of examples 1-10 are repeated using aromatic phosphites as listed in Table II in place of the aliphatic phosphites used in Examples 1-10. The results are shown in Table II and can be compared to the results in Table I. As can be seen, while the use of aliphatic phosphites dramatically improves the performance of the compositions as shown in Table I, the use of aromatic phosphites, i.e., a phosphite having aromatic carbon atoms bonded to the oxygen atoms of the phosphite moiety, does not.

TABLE II

| Example | Aromatic phosphite | Hours to Failure |
| --- | --- | --- |
| Control | none | 46 |
| 11 | tris(2, 4-di-t-butylphenyl) phosphite | 46 |
| 12 | tris(2, 4-di-t-butylphenyl) phosphite | 49 |
| 13 | tris(nonylphenyl) phosphite | 49 |
| 14 | triphenyl phosphite | 49 |

EXAMPLES 15-17

Comparative

The procedures of Examples 1-10 are repeated using 1.0% of four commonly used antioxidants as listed in Table III in place of the aliphatic phosphite used in Examples 1-10. The results are shown in Table III. These results indicate that the addition of commonly used antioxidants do not significantly improve the performance of the compositions. On the other hand, a composition of this invention containing 1.0% of distearyl pertaerythritol diphosphite does not fail when heat aged up to 190 hours.

TABLE III

| Example | Antioxidant | Hours to Failure |
|---|---|---|
| Control | none | 46 |
| 15 | dilauryl thiodipropionate | 46 |
| 16 | 4, 4'-di(α,α-dimethylbenzyl) diphenyl amine | 49 |
| 17 | tetrakis(2, 4-di-t-butylphenyl)-4, 4'-biphenylene diphosphonite | 49 |

EXAMPLES 18-22

The procedures of Examples 1-10 are repeated varying only the amounts of distearyl pentaerythritol diphosphite, as listed in Table IV. The results are shown in Table IV.

TABLE IV

| Example | % phosphite | Hours to Failure |
|---|---|---|
| 18 | 0.1 | 69 |
| 19 | 1.0 | 215 |
| 20 | 2.5 | 215 |
| 21 | 3.5 | 190 |
| 22 | 5.0 | 190 |

EXAMPLES 23-28

The procedures of Examples 1-10 are repeated varying the amounts of aliphatic phosphite, polycarbodiimide (PCD) and hindered phenolic antioxidant as listed in Table V. The results are shown in Table V.

TABLE V

| Example | Phosphite | PCD | Antioxidant | Hours to Failure |
|---|---|---|---|---|
| 23 | 2.0% | 2.0% | 1.0% | 240 |
| 24 | 1.0 | 2.0 | 2.0 | 190 |
| 25 | 1.0 | 2.0 | none | 190 |
| 26 | 2.0 | 1.0 | 2.0 | 164 |
| 27 | 1.0 | none | 2.0 | 6 |
| 28 | 3.0 | none | 2.0 | 6 |

These results show the dramatic improvement in heat aging performance when the composition contains polycarbodiimide and an aliphatic phosphite.

What is claimed is:

1. An insulated wire which comprises
   (1) an electrical conductor, and
   (2) an insulating coating around the conductor which has been formed by melt extruding around the conductor a composition comprising
      (a) about 30% to about 90% of a poly(alkylene terephthalate) wherein the alkylene group contains 2-4 carbon atoms,
      (b) about 3% to about 40% of a polylactone,
      (c) about 0.05% to about 10% of a carbodiimide, and
      (d) about 0.05% to about 10% of an aliphatic phosphite,
   all percentages being by weight based on the weight of the composition.

2. An insulated wire in accordance with claim 1 wherein the coating has a thickness of about 10 mils.

3. An insulated wire in accordance with claim 1 wherein the poly(alkylene terephthalate) and the polylactone are the only polymers in the composition in which all the linkages in the polymer backbone are ester linkages.

4. An insulated wire in accordance with claim 1, wherein the poly(alkylene terephthalate) is poly(butylene terephthalate).

5. An insulated wire in accordance with claim 1, wherein the polylactone is polycaprolactone.

6. An insulated wire accordance with claim 1, wherein the carbodiimide is a polycarbodiimide.

7. An insulated wire in accordance with claim 1, wherein the aliphatic phosphite is selected from the group consisting of distearyl pentaerythritol diphosphite, diisodecyl pentaerythritol diphosphite, bis(2,4-di-t-butylphenyl) pentaerythritol diphosphite, diphenyl isodecyl phosphite, diphenyl isooctyl phosphite, phenyl diisodecyl phosphite, diisooctyl phosphite, triisooctyl phosphite, dilauryl phosphite, trilauryl phosphite, tristearyl phosphite, di-tridecyl phosphite, ethylhexyl diphenyl phosphite, diisooctyl octylphenyl phosphite, diphenyl didecyl (2,2,4-trimethyl-1,3-pentanediol) diphosphite, tris(2-chloroethyl) phosphite, tris(dipropyleneglycol) phosphite, heptakis(dipropyleneglycol) triphosphite, tetraphenyl dipropyleneglycol diphosphite, poly(dipropyleneglycol) phosphite, trilauryl trithiophosphite, bis(tridecyl) hydrogen phosphite and dioleyl hydrogen phosphite.

8. An insulated wire in accordance with claim 1, wherein the aliphatic phosphite is selected from the group consisting of distearyl pentaerythritol diphosphite, diisodecyl pentaerythritol diphosphite, bis(2,4-di-t-butylphenyl) pentaerythritol diphosphite, diphenyl isodecyl phosphite, phenyl diisodecyl phosphite, tris(2-chloroethyl) phosphite, tris(dipropyleneglycol) phosphite, bis(tridecyl) hydrogen phosphite and dioleyl hydrogen phosphite.

9. An insulated wire in accordance with claim 1, wherein the aliphatic phosphite is distearyl pentaerythritol diphosphite.

10. An insulated wire in accordance with claim 1, wherein the composition further comprises one or more flame retardants.

11. An insulated wire in accordance with claim 1, wherein the poly(alkylene terephthalate) is poly(butylene terephthalate), the polylactone is polycaprolactone, the carbodiimide is polycarbodiimide and the aliphatic phosphite is distearyl pentaerythritol diphosphite.

12. A cable which comprises
   (1) a substrate which comprises an electrical conductor or a fiber optic, and
   (2) an insulating jacket which surrounds said substrate and which has been formed by melt extruding around the substrate a composition comprising
      (a) about 30% to about 90% of a poly(alkylene terephthalate) wherein the alkylene group contains 2-4 carbon atoms,
      (b) about 3% to about 40% of a polyactone,
      (c) about 0.05% to about 10% of a carbodiimide, and
      (d) about 0.05% to about 10% of an aliphatic phosphite,
   all percentages being by weight based on the weight of the composition.

13. A cable in accordance with claim 12 wherein the jacket has a thickness of about 10 mils.

14. A cable in accordance with claim 12, wherein the poly(alkylene terephthalate) and the polylactone are the only polymers in the composition in which all the linkages in the polymer backbone are ester linkages.

15. A cable in accordance with claim 12, wherein the poly(alkylene terephthalate) is poly(butylene terephthalate).

16. A cable in accordance with claim 12, wherein the polylactone is polycaprolactone.

17. A cable in accordance with claim 12, wherein the carbodiimide is a polycarbodiimide.

18. A cable in accordance with claim 12, wherein the aliphatic phosphite is selected from the group consisting of distearyl pentaerythritol diphosphite, diisodecyl pentaerythritol diphosphite, bis(2,4-di-t-butylphenyl) pentaerythritol diphosphite, diphenyl isodecyl phosphite, diphenyl isooctyl phosphite, phenyl diisodecyl phosphite, diisooctyl phosphite, triisooctyl phosphite, dilauryl phosphite, trilauryl phosphite, tristearyl phosphite, di-tridecyl phosphite, ethylhexyl diphenyl phosphite, diisooctyl octylphenyl phosphite, diphenyl didecyl (2,2,4-trimethyl-1,3-pentanediol) diphosphite, tris(2-chloroethyl) phosphite, tris(dipropyleneglycol) phosphite, heptakis(dipropyleneglycol) triphosphite, tetraphenyl dipropyleneglycol diphosphite, poly(dipropyleneglycol) phosphite, trilauryl trithiophosphite, bis(tridecyl) hydrogen phosphite and dioleyl hydrogen phosphite.

19. A cable in accordance with claim 12, wherein the aliphatic phosphite is selected from the group consisting of distearyl pentaerythritol diphosphite, diisodecyl pentaerythritol diphosphite, bis(2,4-di-t-butylphenyl) pentaerythritol diphosphite, diphenyl isodecyl phosphite, phenyl diisodecyl phosphite, tris(2-chloroethyl) phosphite, tris(dipropyleneglycol) phosphite, bis(tridecyl) hydrogen phosphite and dioleyl hydrogen phosphite.

20. A cable in accordance with claim 12, wherein the aliphatic phosphite is distearyl pentaerythritol diphosphite.

21. A cable in accordance with claim 12, which further contains at least one additive.

22. A cable in accordance with claim 12, wherein the composition further comprises one or more flame retardants.

23. A cable in accordance with claim 12, wherein the poly(alkylene terephthalate) is poly(butylene terephthalate), the polylactone is polycaprolactone, the carbodiimide is polycarbodiimide and the aliphatic phosphite is distearyl pentaerythritol diphosphite.

24. A cable in accordance with claim 12 wherein the insulating jacket of said composition provides the outer surface of the cable.

25. An insulated wire which comprises
 (1) an electrical conductor, and
 (2) a coating which surrounds and contacts the conductor and which has been formed by melt extruding around the conductor a composition comprising
  (a) about 40% to about 65% of poly(butylene terephthalate),
  (b) about 5% to about 30% of a polylactone in which the repeating unit has the formula

wherein $R_1$ and $R_2$ are hydrogen, methyl or ethyl, and m is 2-5,
  (c) about 0.1% to about 5% of a carbodiimide, and
  (d) about 0.1% to about 5% of an aliphatic phosphite in which each of the carbon atoms linked to an oxygen atom of the phosphite moiety is part of a saturated or unsaturated alkyl or alkenyl group in which any substituents are phenyl, hydroxyl or carboxyl groups.

26. An insulated wire according to claim 25 wherein the coating has thickness of about 10 mils.

27. An insulated wire according to claim 25 wherein the polylactone is poly caprolactone.

28. An insulated wire according to claim 27 wherein the aliphatic phosphite is selected from the group consisting of distearyl pentaerythritol diphosphite, diisodecyl pentaerythritol diphosphite, bis(tridecyl) hydrogen phosphite, and dioleyl hydrogen phosphite.

29. An insulated wire according to claim 25 wherein the poly(butylene terephthalate) and the polylactone are the only polymers in the composition in which all the linkages in the polymer backbone are ester linkages.

30. An insulated wire according to claim 25 wherein the poly(butylene terephthalate) and the polylactone are the only polymers in the composition.

31. An insulated wire according to claim 25 wherein the insulating coating of said composition is the sole coating around the wire.

32. An insulated wire in accordance with claim 1 wherein the insulating coating of said composition is the sole coating around the wire.

* * * * *